(12) United States Patent
Van Erp

(10) Patent No.: US 11,533,925 B2
(45) Date of Patent: Dec. 27, 2022

(54) THAWING-APPARATUS AND METHOD TO THAW A SUBSTANCE

(71) Applicant: GEA FOOD SOLUTIONS BAKEL B.V., Bakel (NL)

(72) Inventor: Joost Van Erp, Nuenen (NL)

(73) Assignee: GEA FOOD SOLUTIONS BAKEL B.V., Bakel (NL)

( * ) Notice: Subject to any disclaimer, the term of this patent is extended or adjusted under 35 U.S.C. 154(b) by 115 days.

(21) Appl. No.: 16/608,337

(22) PCT Filed: May 9, 2018

(86) PCT No.: PCT/EP2018/062000
§ 371 (c)(1),
(2) Date: Oct. 25, 2019

(87) PCT Pub. No.: WO2018/206640
PCT Pub. Date: Nov. 15, 2018

(65) Prior Publication Data
US 2020/0178547 A1     Jun. 11, 2020

(30) Foreign Application Priority Data

May 9, 2017 (EP) ..................................... 17170103
Mar. 1, 2018 (EP) ..................................... 18159561

(51) Int. Cl.
*H05B 6/64* (2006.01)
*H05B 6/68* (2006.01)
(Continued)

(52) U.S. Cl.
CPC .................. *A23B 4/07* (2013.01); *A23B 4/01* (2013.01); *A23L 3/01* (2013.01); *A23L 3/365* (2013.01);
(Continued)

(58) Field of Classification Search
CPC .... A23B 4/01; A23B 4/07; A23B 5/01; A23B 7/01; A23B 9/04; A23L 3/01; A23L 3/02;
(Continued)

(56) References Cited

U.S. PATENT DOCUMENTS 4,457,220 A    7/1984 Entremont et al.
4,507,530 A    3/1985 Smith
(Continued)

FOREIGN PATENT DOCUMENTS

BY     11854 C1     4/2009
CN    102986756 A    3/2013
(Continued)

OTHER PUBLICATIONS

International Search Report and Written Opinion for International Application No. PCT/EP2018/062000, dated Jun. 29, 2018.
(Continued)

*Primary Examiner* — Quang T Van
(74) *Attorney, Agent, or Firm* — The Dobrusin Law Firm, P.C.

(57) ABSTRACT

The present invention relates to a thawing-apparatus, in which a substance is preferably heated. The present invention further relates to a method to thaw a substance with radio-frequency waves.

19 Claims, 4 Drawing Sheets

(51) Int. Cl.
  *H05B 6/46* (2006.01)
  *A23B 4/07* (2006.01)
  *A23B 4/01* (2006.01)
  *A23L 3/01* (2006.01)
  *A23L 3/365* (2006.01)
  *H05B 1/02* (2006.01)
  *H05B 6/78* (2006.01)

(52) U.S. Cl.
  CPC ......... *H05B 1/0261* (2013.01); *H05B 6/6447* (2013.01); *H05B 6/688* (2013.01); *H05B 6/782* (2013.01); *A23V 2002/00* (2013.01)

(58) Field of Classification Search
  CPC ....... A23L 3/16; A23L 3/365; A23V 2002/00; H05B 1/0261; H05B 6/6447; H05B 6/688; H05B 6/782
  USPC ....... 219/703, 702, 704, 705, 771, 778, 779, 219/780; 99/358; 331/46, 50, 52, 56
  See application file for complete search history.

(56) References Cited

U.S. PATENT DOCUMENTS

| | | | |
|---|---|---|---|
| 4,619,550 A * | 10/1986 | Jeppson | E01C 19/1004 366/25 |
| 5,253,567 A | 10/1993 | Gunawardena | |
| 6,246,040 B1 | 6/2001 | Gunn | |
| 2005/0019025 A1 * | 1/2005 | Wild | H05B 6/60 392/312 |
| 2006/0006172 A1 | 1/2006 | Sedlmayr | |
| 2011/0033584 A1 | 2/2011 | Bilchinsky et al. | |
| 2011/0159103 A1 | 6/2011 | Akashe et al. | |
| 2012/0103975 A1 | 5/2012 | Okajima | |
| 2015/0271877 A1 | 9/2015 | Johansson | |
| 2016/0013975 A1 | 1/2016 | Van Herpen et al. | |
| 2016/0278170 A1 | 9/2016 | Atherton et al. | |
| 2016/0324195 A1 | 11/2016 | Simunovic et al. | |
| 2016/0331004 A1 * | 11/2016 | Strolenberg | A23B 4/07 |
| 2020/0178547 A1 | 6/2020 | Van Erp | |

FOREIGN PATENT DOCUMENTS

| | | |
|---|---|---|
| CN | 105142253 A | 12/2015 |
| CN | 105698228 A | 6/2016 |
| CN | 110650632 A | 1/2020 |
| EP | 2322883 A1 | 5/2011 |
| EP | 3935956 A1 | 11/2022 |
| FR | 2264494 A1 | 10/1975 |
| GB | 2098040 A | 11/1982 |
| JP | H07255388 A | 10/1995 |
| RO | 125073 B1 | 9/2010 |
| RU | 2189540 C1 | 9/2002 |
| RU | 2208983 C1 | 7/2003 |
| RU | 2295095 C1 | 3/2007 |
| RU | 2375915 C2 | 12/2009 |
| RU | 104823 U1 | 5/2011 |
| RU | 2459610 C2 | 8/2012 |
| WO | 2009/116923 A1 | 9/2009 |
| WO | 2014/147651 A1 | 9/2014 |
| WO | 2016/100539 A1 | 6/2016 |
| WO | 2018/206637 A1 | 11/2018 |
| WO | 2018/206639 A1 | 11/2018 |
| WO | 2018/206641 A1 | 11/2018 |
| WO | 2018/206642 A1 | 11/2018 |

OTHER PUBLICATIONS

International Preliminary Report on Patentability for International Application No. PCT/EP2018/062000, dated Sep. 5, 2019.
Yadav Deep et al—Microwave technology for disinfestation of cereals and pulses, pp. 3568-3576, dated Dec. 16, 2012.
English translation summary of the Office Action dated Sep. 1, 2021, for Russian Patent Application No. 2019 139 283.
Examination Report from Brazilian patent application BR 112019022160-3 dated Sep. 8, 2022.
Examination Report from Brazilian patent application BR122021008965-6 dated Sep. 15, 2022.
EPO Summons, dated Oct. 5, 2022, to attend oral proceedings concerning EP 18721411,9-1105 and the remarks contained therein.

* cited by examiner

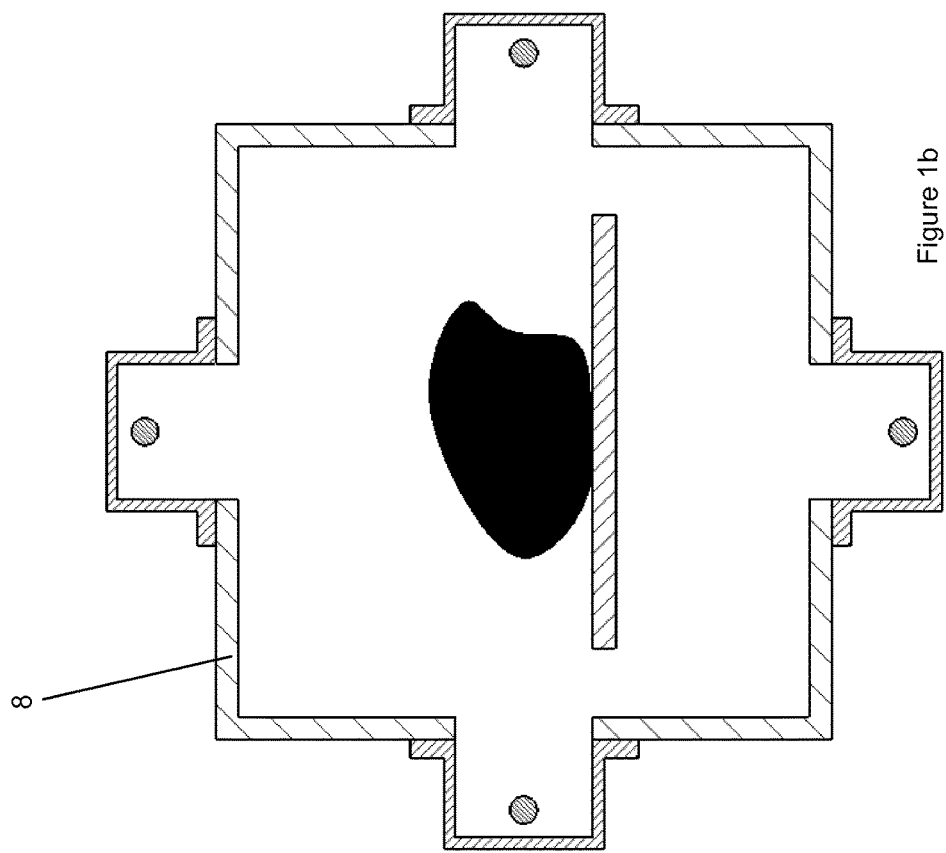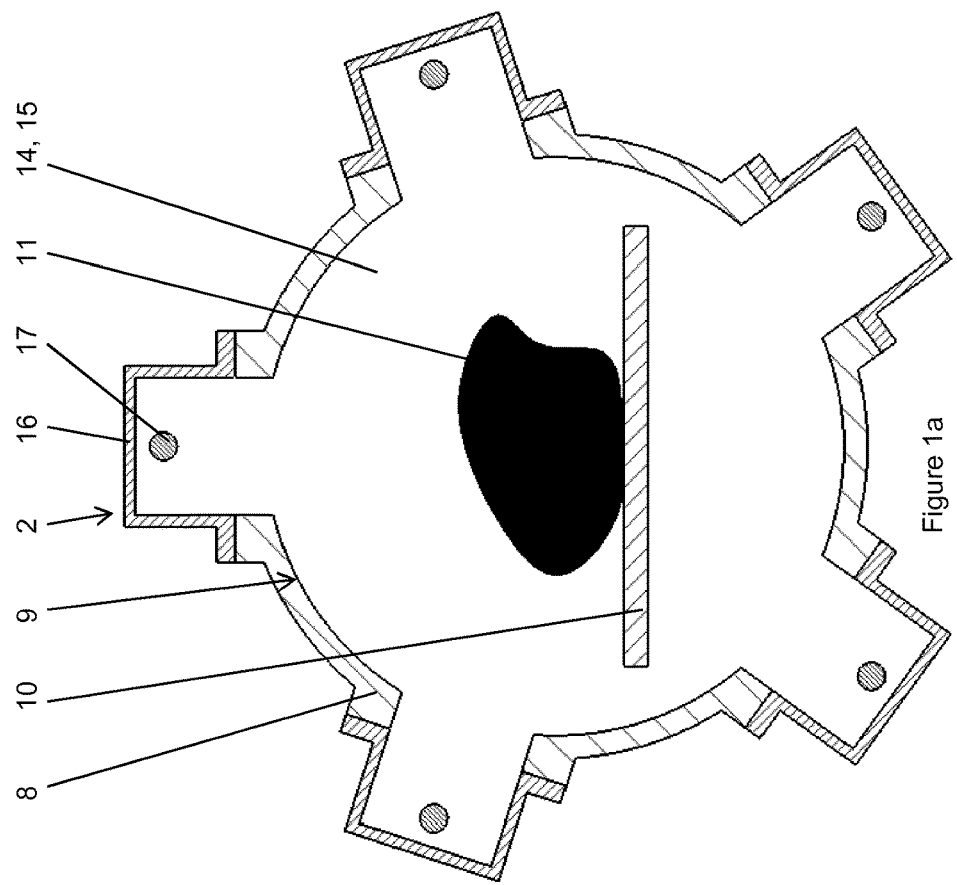

THAWING-APPARATUS AND METHOD TO THAW A SUBSTANCE

The present invention relates to a Thawing-apparatus, in which a frozen substance is heated to a temperature in the vicinity of 0° C. The present invention further relates to a method of thawing a substance with radio-frequency waves.

Thawing products in industrial application is well known in the state in the art, for example from EP 2 327 310 B1 or WO 2010 133 356. The deep-frozen substance, which has a temperature around −20° C., is heated to the desired temperature. However, the thawing-apparatus and/or thawing methods according to the state in the art take relatively long and/or the substance is not thawed evenly.

It is therefore the objective of the present invention to provide a thawing-apparatus and a method that do not comprise the deficiencies according to the state in the art.

The problem is attained with a thawing-apparatus, in which a frozen substance is heated to a temperature in the vicinity of 0° C., which comprises at least one, preferably a multitude, solid-state radio frequency source(s).

The disclosure made regarding this subject matter of the present invention also applies to the other invention and vice versa. Subject matters disclosed regarding this invention can also be combined with subject matters from other inventions of the present application.

The present invention relates to a thawing-apparatus with a solid-state radio frequency (RF)-transistor(s) in a RF power amplifier. A radio frequency power amplifier is an electronic amplifier, that converts a low power radio frequency signal into a higher power signal. Typically, RF-power amplifiers drive the antenna of a transmitter. The antenna can be coupled to and/or located in a waveguide, wherein the antenna can radiate the microwaves into the waveguide which preferably is designed of reflective material and can guide the microwaves to a desired location, for example into the product chamber wherein the products to be treated are located. Compared to a magnetron, an advantages of a solid-state RF energy technology is a low voltage drive, semiconductor reliability and lower energy consumption due to the advanced control system. In the inventive apparatus a substance is thawed; i.e. the temperature of the product is increased from a temperature, for example around −20° C. to a temperature in the range of −4-+3, preferably −2--3° C. The substance is preferably an edible product for human- and/or animal-consumption, particularly protein containing food- or feed-product, particularly meat. The meat can be meat at a bone, muscle meat and/or minced meat. The product can also be fish and/or dough.

Preferably the thawing is executed such that no drip loss will occur; no or only a little amount of liquid is lost during thawing. Drip loss will occur as soon the temperature of the frozen substance exceeds the crystallization point of the food product.

The crystallization point can be determined by:

A—Temperature Measurement

Temperature measurement means can provided within the structure of the microwave unit and/or in the substance itself. A predetermined temperature can be inputted in the control unit which temperature reflects the temperature of the crystallization point. As soon as or even before this temperature is reached the thawing process will be finished and/or the solid-state radio frequency source(s) are controlled accordingly. There can be two or more temperature measurement means, which can be utilized to control the thawing of the substance.

B—Measuring Frozenness

One or a multitude of frozenness measurement means are provided within the structure of the microwave unit. As soon as the sensor(s) reache(s) the trigger point which reflects the crystallization point is reached or even before that, the pre-defrosting/tempering process will be finished and/or the solid-state radio frequency source(s) are controlled accordingly.

C—Measuring Absorption

As soon as the crystallization point will be reached the necessary energy per time unit needed to overcome the crystallization is relatively high compare to the energy previously needed to increase the temperature of the product. By measuring the absorption, it will be noticed that radiated energy will be almost entirely absorbed by the food product and consequently almost no absorption back in the antenna will be measured. In case this happens, it can be assumed that the crystallization point is reached and then or even before this point, the pre-defrosting/tempering process will be finished. There can be two or more temperature measurements, which can be utilized to control the thawing of the substance.

According to a preferred embodiment of the present invention, the inventive apparatus may not only comprise one but a multitude of solid-state radio frequency sources. This can be accomplished by using one or more antennas and/or one or more waveguides. Each radio frequency source can be preferably powered individually and each radio frequency source can be preferably controlled, more preferably closed loop controlled, individually. The wavelength, amplitude and/or the direction of the radiation can be controlled, for example by utilizing one or more of the above described measurements of the progress of the thawing process.

The solid-state radio frequency sources are preferably provided in an array of n columns and m rows, wherein n is an integer >1 and m is an integer ≥1. Preferably, the solid-state radio frequencies are arranged equidistantly in one row and/or the columns are also arranged equidistantly. In case a multitude of sources, they can be arranged at random.

Preferably, the solid-state radio frequency sources are provided equidistantly around the circumference of product chamber. In this chamber, the substance to be thawed will be placed or it will be transported through this product chamber.

According to a preferred embodiment, the thawing-apparatus comprises an inlet and an outlet, which are spaced apart from each other. The substance enters the apparatus, preferably a product chamber through the inlet, passes through the apparatus/product chamber and then exits the apparatus/product chamber through the exit which is different from the inlet.

Preferably, the inventive thawing-apparatus comprises means to transport the substance past the solid-state radio frequency source(s). The means can be a conveyor, for example a belt, preferably an endless belt or an endless chain, wherein the chain is preferably not made from a metal material. The conveyor is preferably at least partially transmittable for the RF-radiation, so that the conveyor is not or only little heated by the microwave radiation. This conveyor transports the substance, preferably as individual frozen blocks, past the solid-state radio frequency source(s). The products are preferably transported continuously or intermittently by the conveyor. The speed of the conveyor is preferably adjustable, so that the residence time in the product chamber can be varied.

According to another preferred embodiment of the present invention, the substance is provided as a batch, which is placed in the vicinity of the solid-state radio frequency source(s), preferably an array of solid-state radio frequency sources. The batch can be for example a bucket, a trough or the like, with the substance in it. Preferably, the substance is provided as a solid block. The solid-state radio frequency source can for example be moved towards the frozen substance after it has been placed into the vicinity of the solid-state radio frequency source. At least a part of the solid-state radio frequency source(s) can be fixed to a frame of the inventive apparatus, which can be reciprocated between a remote- and an operating-position. In the remote position, the batch can be place in or near the apparatus and then the solid-state radio frequency source(s) are moved into their operating position.

Preferably, the thawing-apparatus comprises a control system to control the solid-state radio frequency sources. The control system preferably comprises one or more sensors, whose signal(s) is used to control one or more solid-state radio frequency source(s), preferably individually and/or related to each other. Gradually heating of the substance can be achieved by controlling the electromagnetic fields by controlling the power level, frequency and/or phase versus time with such precision that, for example, an even energy distribution in the product chamber or in the product will be achieved. The RF-energy load can be adapted to the progress of the treatment process. For instance, during thawing the RF-energy load can change. This change in load can be detected, for example via the antenna by measuring the reflected energy. The control system will compare the transmitted energy via the antenna with the reflected energy and will consequently adjust the energy to be transmitted by the antenna. At each solid-state RF energy sources, the amplitude, the frequency and/or the phase can be controlled individually and/or in groups. The antenna may function as a sensor, for example to detect the radiation reflected from the substance to be thawed.

The sensor(s) can sense one or more properties of the substance, for example its temperature and/or the energy absorbed by the substance and/or the frozenness. One sensor can measure what kind of radiation is reflected from the substance, for example the wavelength. In case the substance is transported during its treatment with the RF-radiation, there can be multiple sensors along the transportation path. The local reading of the sensors can be used to control the corresponding local solid-state radio frequency source(s) and/or the solid-state radio frequency source(s) upstream and/or downstream from the respective sensor.

The inventive thawing-apparatus is preferably part of a food production line, which comprises one or more treatment stations, for example a mixing-, a further heating-, a cooling-, cutting- or grinding-station, a forming station, a batter-station and/or a marination-station. The stations can be combined with conveyors. Preferably the substance enters the line at its entrance and then passes successively all stations of the respective line until it finally exits the line.

Another preferred or inventive embodiment of the present invention is therefore a production line, particularly a food production line comprising the inventive apparatus.

Preferably, the line comprises a tumbler or a mixer downstream from the thawing apparatus. This tumbler and/or a mixer preferably comprises steam-injection means and/or a jacket and/or the carrier which can be heated or cooled. Furthermore, according to a preferred embodiment of the present invention, vacuum can be applied to the tumbler or mixer. In the tumbler/mixer, the temperature of the substance can be further increased. The injection of steam preferably takes place under vacuum. The addition of steam and the heating via the jacket and/or carrier can take simultaneously. The tumbling mixing can be used to massage water which comes off the substance during thawing into the substance.

After the additional heating step, the substance is preferably cooled again, preferably down to +2-+3° C. The cooling can take place in the same tumbler/mixer, in which the heating has taken place. Preferably the cooling is also executed under vacuum, which improves the tenderness of the substance in case it is meat. The person skilled in art understands, that an additional tumbler/mixer can be utilized for the cooling step.

According to another preferred embodiment, the inventive apparatus is provided together with a former and/or a batter, preferably in one line.

Preferably the inventive thawing-apparatus, particularly the radiation can be at least partially isolated from the ambient by one or more valves. The substance enters the apparatus, for example by means of a conveyor. Then the conveyor is stopped and a valve, like a gate is closed, preferably at the entrance and at the exit of the conveyor, so that no or little radiation can exit from the apparatus to the ambient. After the RF-treatment, the valve/gate is reopened again and the thawed substance can exit the apparatus and preferably simultaneously untreated substance enters the apparatus.

The problem is also solved with a method of thawing a substance with radio-frequency waves, characterized in, that the radio-frequency waves are provided with one or more solid-state radio frequency source(s).

The disclosure made regarding this subject matter of the present invention also applies to the other invention and vice versa. Subject matters disclosed regarding this invention can also be combined with subject matters from other inventions of the present application.

The substance to be thawed can be for example meat, fish or dough.

Preferably the substance is transported from an inlet of a treatment apparatus to an exit of the same apparatus which are spaced apart.

The substance can be transported continuously and or intermittently. They can be transported as a string or as individual portions, preferably as frozen blocks.

Preferably one or more sensors are provided which measure one or more properties of the substance and/or the radiation reflected from the product and/or the frozenness. The measurements are preferably at least executed twice during its treatment with RF-radiation. The changes of the properties/values are determined and can be taken into account when controlling the solid-state radio frequency source(s).

Transistor technology generates powerful RF fields. Preferably multiple RF sources will be applied, the sources can be controlled individually and preferably related to each other. Gradually heating of the substance can be achieved by controlling the electromagnetic fields by controlling the power level, frequency and phase versus time with such precision that an even energy distribution will be achieved. In general, in case of a change in load in a certain spot of the product, substance, mass, product flow or mass flow, the controller can control the specific parameter in that certain spot in order to correct the adverse effects of the load change. For instance, during thawing the load will change. This change in load will be detected via the antenna by measuring the reflected energy. The control system will compare the transmitted energy via the antenna with the reflected energy and will consequently adjust the energy to be transmitted by the antenna. For instance, if no load is present within the product chamber, no energy will be absorbed, the antenna receives the reflected energy and the control unit will stop transmitting new energy to the product chamber. With solid-state RF energy sources, the amplitude, the frequency and the phase can be controlled for each and every antenna. Such an advanced energy management system based on a fast response to the heat demand in certain spots of the product(s) to be heated prevents damaging of internal component and prevents an uncontrolled product treatment with uneven energy distribution. Due to the efficient use of energy resulting in less energy loss an additional advantage of solid-state RF energy sources is an increase in yield of products to be treated.

Preferably, the substance is further heated, preferably by steam and/or a heated jacket and/or carrier in a tumbler or mixer. The further heating preferably takes place under vacuum. Particularly the steam injection and/or condensation takes place under vacuum.

Preferably, the substance it is cooled, more preferably down to +2-+3° C., after thawing and/or after further heating. During cooling, the substance is preferably mixed/tumbled. The cooling preferably takes place under vacuum.

According to another preferred or inventive embodiment of the present invention, the substance is subjected to the microwave radiation, at least temporarily in a film-cover.

The disclosure made regarding this subject matter of the present invention also applies to the other invention and vice versa. Subject matters disclosed regarding this invention can also be combined with subject matters from other inventions of the present application.

Preferably, the frozen block is provided in a film cover. Together with this film cover, the frozen block is subjected to microwave radiation, particularly over a limited amount of time, particularly until the surface of the block is heated. Subsequently, the film cover is removed and the thawing is finalized or the cover remains in place over the entire thawing process.

The inventions are now explained according to the Figures. The explanations apply for all embodiments of the present invention likewise.

FIGS. 1a and 1b show a first embodiment of the present invention.

Figure 2B:
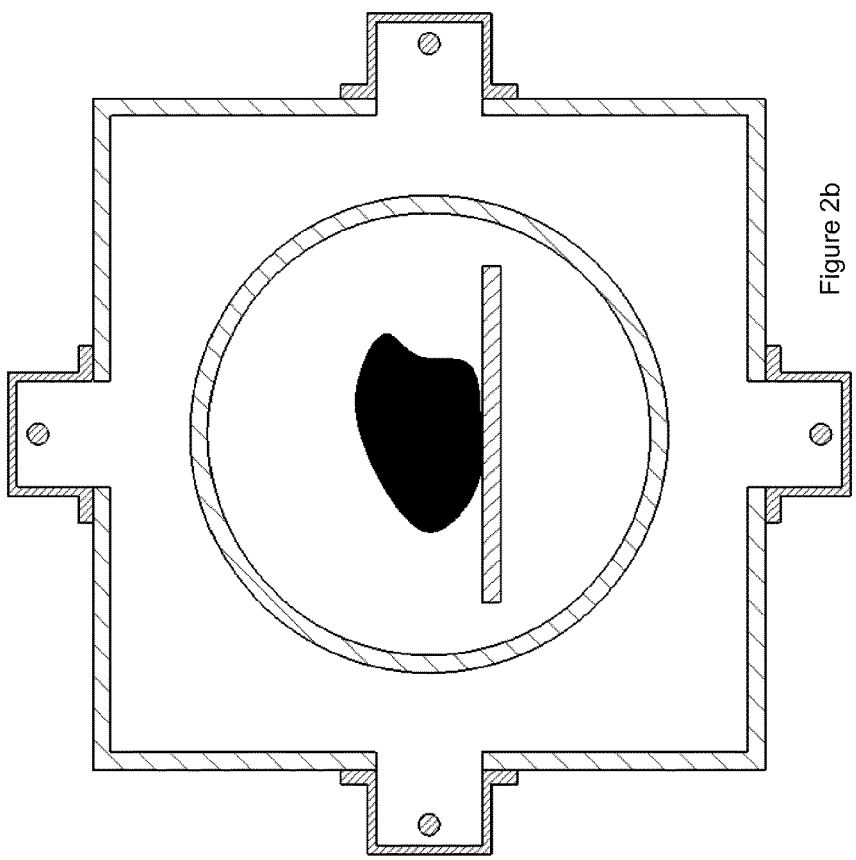
FIGS. 2a and 2b show a second embodiment of the present invention.

For all described embodiments, the preferred substance to be thawed is meat.

A first embodiment of a solid-state RF energized microwave apparatus is depicted in FIG. 1a, which comprises one, but preferably multiple solid-state RF sources 2 which among other things each comprises a waveguide 16 and/or an antenna 17. In the present case, the inventive apparatus comprises a multitude of solid-state RF sources 2, which are provided at the circumference of a product chamber 14 and preferably, equidistantly. The number of sources 2 in circumferential direction can depend on the efficiency, of the microwaves to heat up substance 11 evenly, measured for example the temperature rises per unit of time. In this embodiment, the chamber 15 in which the solid-state RF sources 2 are located and the product chamber 14, in which the product to be treated/heated is provided are one and the same chamber and are defined by housing 8. The housing can be similar to a Faraday cage to prevent electromagnetic waves coming out of the housing. At least inner wall 9 but preferably the entire housing 8 can be made of steel, for instance stainless steel. Conveyor means 10 for instance a conveyor belt is positioned within housing 8 and conveys product 11, e.g. a formed food product, through housing 8. However, it is also possible to place a batch product into the product chamber, treat it with RF-radiation and remove it, once the treatment is terminated. The placement of the batch can be executed by motor means. FIG. 1b depicts a square design of housing 8. Other than that, the explanations regarding FIG. 1a also apply to FIG. 1b.

Figure 2A:
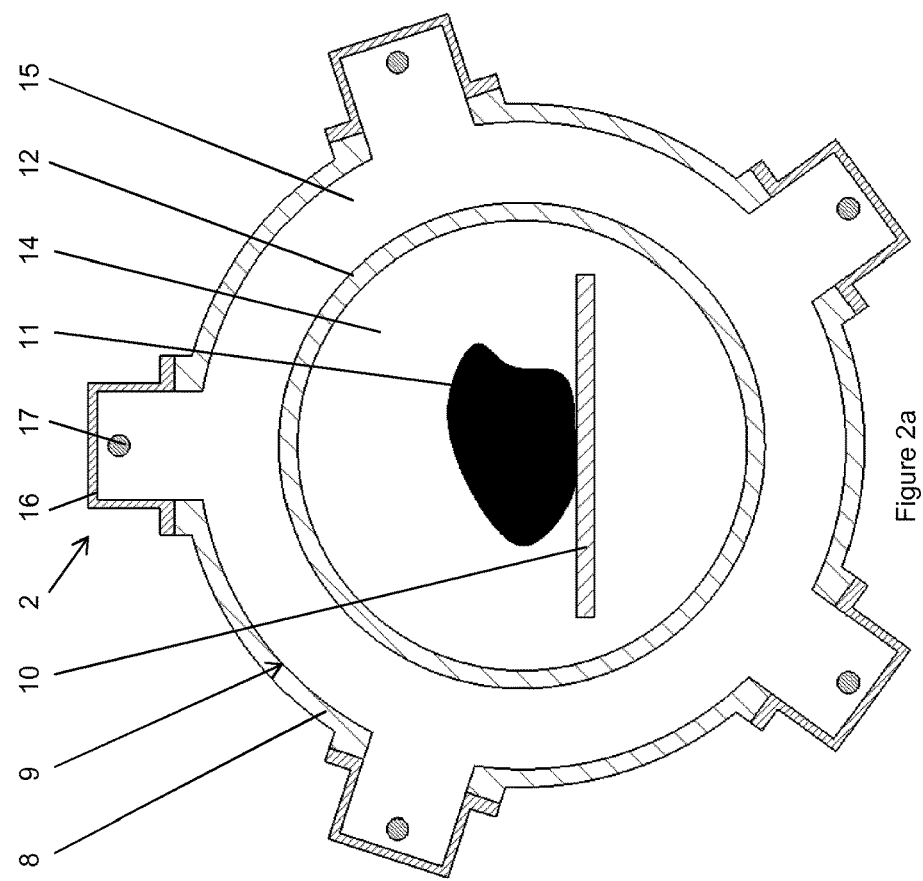
Figure 3B:
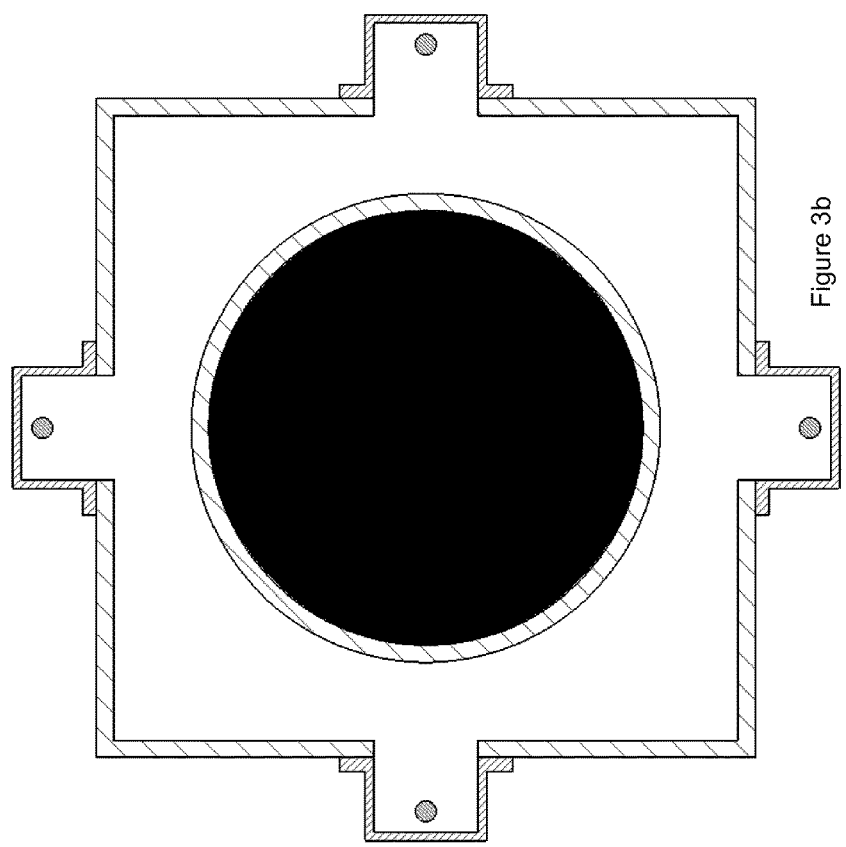
FIGS. 3a and 3b show a third embodiment of the present invention.
Figure 3A:
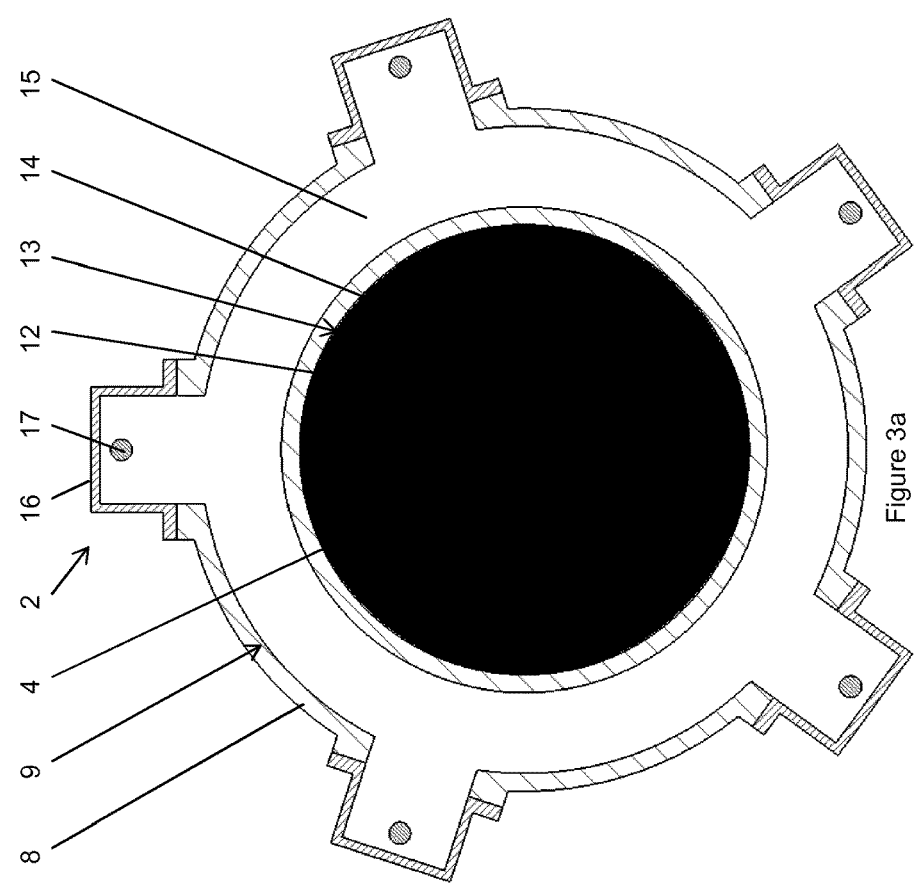

FIGS. 2a and 2b depict a second embodiment of the inventive apparatus, wherein in contrast to the embodiments according to FIGS. 1a and 1b microwave tube or sphere 12 is provided. The explanations given regarding the embodiment according to FIGS. 1a and 1b also apply to this embodiment. The microwave tube/sphere 12 separates the product chamber 14 from the chamber 15, in which the solid-state RF sources 2 are located. The tube material is preferably transparent for microwaves supplied by the solid-state RF sources 2 and more preferably do not absorb microwave energy and will therefore not be heated up by the microwave energy but, if any, only heated up by the warmed-up product. To effectively convert the microwave energy into increased temperature of the substance to be heated, the material of the tube/sphere 12 is not be metal, but certain plastic materials are suitable. Substance 11 is located within the product chamber 14 and will be treated, preferably heated by one preferably multiple solid-state sources 2 located in chamber 15. This embodiment is, for example, preferred in case cleaning agents used to clean product chamber 14 may not be come in contact with the solid-state sources 2. The tube/sphere 12 can also be used to direct the substance past the solid-state RF sources 2. In this case, the substance touches the inner circumference of tube at least locally. This embodiment of a solid-state RF energized microwave apparatus is depicted in FIGS. 3a and 3b. One, but preferably multiple solid-state RF sources 2 are positioned around microwave tube/sphere 12 through which a substance 4, for instance frozen minced meat or blocks of frozen meat is passed.

Figure 4:
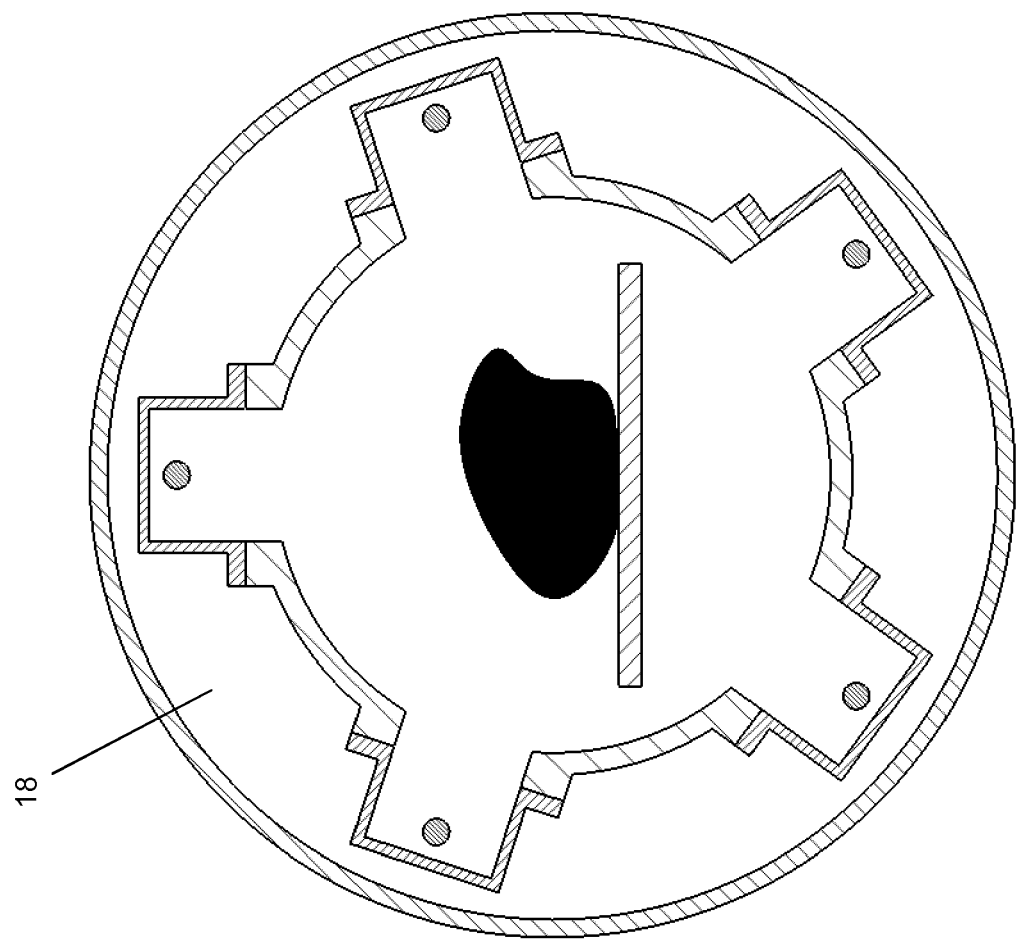
FIG. 4 shows a fourth embodiment of the present invention.

FIG. 4 depicts an embodiment related to FIG. 1a but will also apply to the embodiments according to FIGS. 1b-3b wherein a cooling chamber 18 is provided which is connected to a cooling circuit for instance a water cooling or a gas-, preferably air cooling circuit. The cooling chamber 18 surrounds the apparatus as depicted in one of FIGS. 1a-3b. While applying solid-state RF energy sources, microwave energy will be transmitted to a certain spot of the product to be treated only when needed. Despite this efficient energy management additional cooling of the waveguides and connected antennas may be desirable in case of high energy output, for example during a long period of time. In another not depicted embodiment also the solid-state RF energy source will be cooled as well as the power supply. This can be done per RF energy source as needed. The cooling of the RF energy source(s) is preferably controlled by a temperature measurement, which measures the temperature of one or more of the RF energy source and based on this reading controls a fluid flow of the cooling agent and/or its temperature.

All embodiments depicted in FIGS. 1-4 can be carried out in an apparatus with solid-state RF energy technology designed for batch operation as well as designed for continuous operation. Batch operation demands an apparatus with at least one gate, for example a door, through which the mass 4 or product 11 to be treated can enter the treatment section 6. In case the apparatus comprises a second gate the mass or product can removed from the treatment session via this second gate.

For all embodiments above the design of housing 8 is not limited to a circular design as depicted in FIG. 1*a*-3*a* but can be shaped differently as depicted in FIG. 1*b*-3*b*. Important is that heat treatment of product 11 or substance 4 will not adversely affected by the bouncing microwaves via inner wall 9 of housing 8.

For all embodiments depicted above the design of microwave tube 12 is not limited to a circular design but can be shaped differently. Especially in case a mass 4 flows through the tube as depicted in FIG. 3*a* circular design is advantageous with respect to pressure distribution. Preferably inner wall 13 should be provided with smooth walls in order to reduce shear forces on the food mass and to facilitate cleaning. Microwave tube 12 is preferably a fixed part within the depicted assembly and is isolated with respect to housing 8 and solid-state RF energy sources 2 which would be advantageous with respect to hygiene. Cleaning of the microwave tube can be done manually but preferably by an integrated CIP system.

LIST OF REFERENCE SIGNS 1 thawing-apparatus, industrial thawing-apparatus
2 solid-state RF energy source
3 mass supply system, hopper
4 substance, edible substance, food substance
5 supply section, entrance
6 microwave section, treatment section
7 discharge section
8 housing.
9 inner wall housing 8
10 conveyor means
11 product, food product
12 microwave chamber, microwave tube, microwave sphere
13 inner wall microwave tube/sphere 12
14 product chamber
15 solid-state source chamber
16 waveguide
17 antenna
18 cooling chamber

The invention claimed is:

1. A thawing apparatus, in which a frozen substance is heated to a temperature in a vicinity of 0° C., wherein the thawing-apparatus comprises:
   at least one solid-state radio frequency source;
   a conveyor to transport the substance past the at least one solid-state radio frequency source, the conveyor being at least partially transmittable for RF-radiation;
   a product chamber, in which the substance is located; and
   a plurality of solid-state radio frequency sources that are provided equidistantly around a circumference of the product chamber.

2. The thawing apparatus according to claim 1, wherein the at least one solid-state radio frequency source is provided in an array of n columns and m rows, wherein n is an integer >1 and m is an integer ≥1.

3. The thawing apparatus according to claim 1, wherein the thawing-apparatus comprises an inlet and an outlet, which are spaced apart from each other.

4. The thawing apparatus according to claim 1, wherein the substance is provided as a batch, which is placed in a vicinity of the at least one solid-state radio frequency source.

5. The thawing apparatus according to claim 1, wherein the thawing-apparatus comprises a control system to control the at least one solid-state radio frequency source.

6. The thawing apparatus according to claim 1, wherein the thawing-apparatus comprises a control system and a sensor that measures a frozenness of the substance, wherein a signal of the sensor is utilized by the control system to control the at least one solid-state radio frequency source so that a crystallization point of the substance is not exceeded.

7. The thawing apparatus according to claim 1, wherein the thawing-apparatus is at least partially isolated by one or more valves.

8. A production line comprising the thawing apparatus according to claim 1.

9. The production line according to claim 8, wherein the production line comprises a tumbler or a mixer downstream from the thawing-apparatus.

10. The production line according to claim 8, wherein the production line comprises a cooling means downstream from the thawing-apparatus and/or from a tumbler/mixer.

11. The thawing apparatus according to claim 1, wherein the thawing-apparatus comprises a sensor that measures energy absorbed by the substance to control the at least one solid-state radio frequency source so that a crystallization point of the substance is not exceeded.

12. The thawing apparatus according to claim 1, wherein the thawing-apparatus comprises a plurality of chambers disposed around a circumference of the product chamber, each one of which contains one of the plurality of solid-state RF sources; and a microwave tube/sphere that is disposed around the circumference of the product chamber and separates the product chamber from the plurality of chambers.

13. The thawing apparatus according to claim 12, wherein the substance is in contact with an inner circumference of the microwave tube/sphere, at least locally.

14. The thawing apparatus according to claim 13, wherein a material of the microwave tube/sphere is transparent for microwaves.

15. The thawing apparatus according to claim 12, wherein a material of the microwave tube/sphere is transparent for microwaves, and the material comprises plastic and/or is free of metal.

16. The thawing apparatus according to claim 15, wherein the thawing-apparatus comprises a housing in which the product chamber and the microwave tube/sphere is located, wherein the housing is made of metal, steel, or stainless steel.

17. The thawing apparatus to claim 12, wherein the thawing-apparatus comprises a housing in which the product chamber is located, the housing comprises a plurality of openings defined around its circumference, each of the openings lead to the chamber in which one of the plurality of solid-state radio frequency sources is located, and the thawing-apparatus comprises a waveguide covering the opening and configured to direct RF-radiation in a direction of the substance.

18. The thawing apparatus according to claim 17, wherein the plurality of openings are spaced about 72 degrees apart or about 90 degrees apart.

19. The thawing apparatus according to claim 12, wherein the plurality of chambers are spaced about 72 degrees apart or about 90 degrees apart.

* * * * *